Sept. 24, 1940.   L. BERNSTEIN   2,215,574
APPARATUS FOR REMOVING DUST FROM AIR OR OTHER GASES
Filed Feb. 5, 1940

INVENTOR
Leiba Bernstein
BY Care M. Cohen
ATTORNEY

Patented Sept. 24, 1940

2,215,574

UNITED STATES PATENT OFFICE 2,215,574

APPARATUS FOR REMOVING DUST FROM AIR OR OTHER GASES

Leiba Bernstein, New York, N. Y.

Application February 5, 1940, Serial No. 317,233

7 Claims. (Cl. 261—3)

My invention relates to an apparatus for removing dust from air or other gas laden therewith.

In accordance with this invention dust-laden air or other gas removed by exhausters is brought forcibly into contact with a body of water or other suitable liquid in a suitable casing or housing whereby the dust is driven into said body of water and thereby separated from the air which is caused to pass from said casing in dust-free or substantially dust-free condition. Pathogenic bacteria which may be present in the dust-laden air can also be destroyed by a disinfectant in the water into which the dust is driven.

Also, in accordance with the present invention, provision is made for removing the dust from the casing during the operation of the apparatus. For this purpose means are provided to remove the dust from the water below the upper surface thereof as well as to remove dust which collects on the surface of the water in the housing. In this connection it will be observed that the removal of the dust from the surface of the water facilitates the impelling of dust into the water from which it is subsequently removed. It will be understood that the dust contained in the air may be in part composed of relatively light particles, as for example a dust content of air in a flax mill, which light particles might collect on the surface of the water and, if not removed, interfere with the passage of the heavier dust particles into the water. Accordingly, by providing means to skim off the light dust particles from the water continuously or continually during the operation of the apparatus, the efficiency of the apparatus is greatly improved and the air is more thoroughly freed from dust.

The invention will be more fully understood from the following description considered with reference to the accompanying drawing in which.

Figures 1, 2, 3, 4:
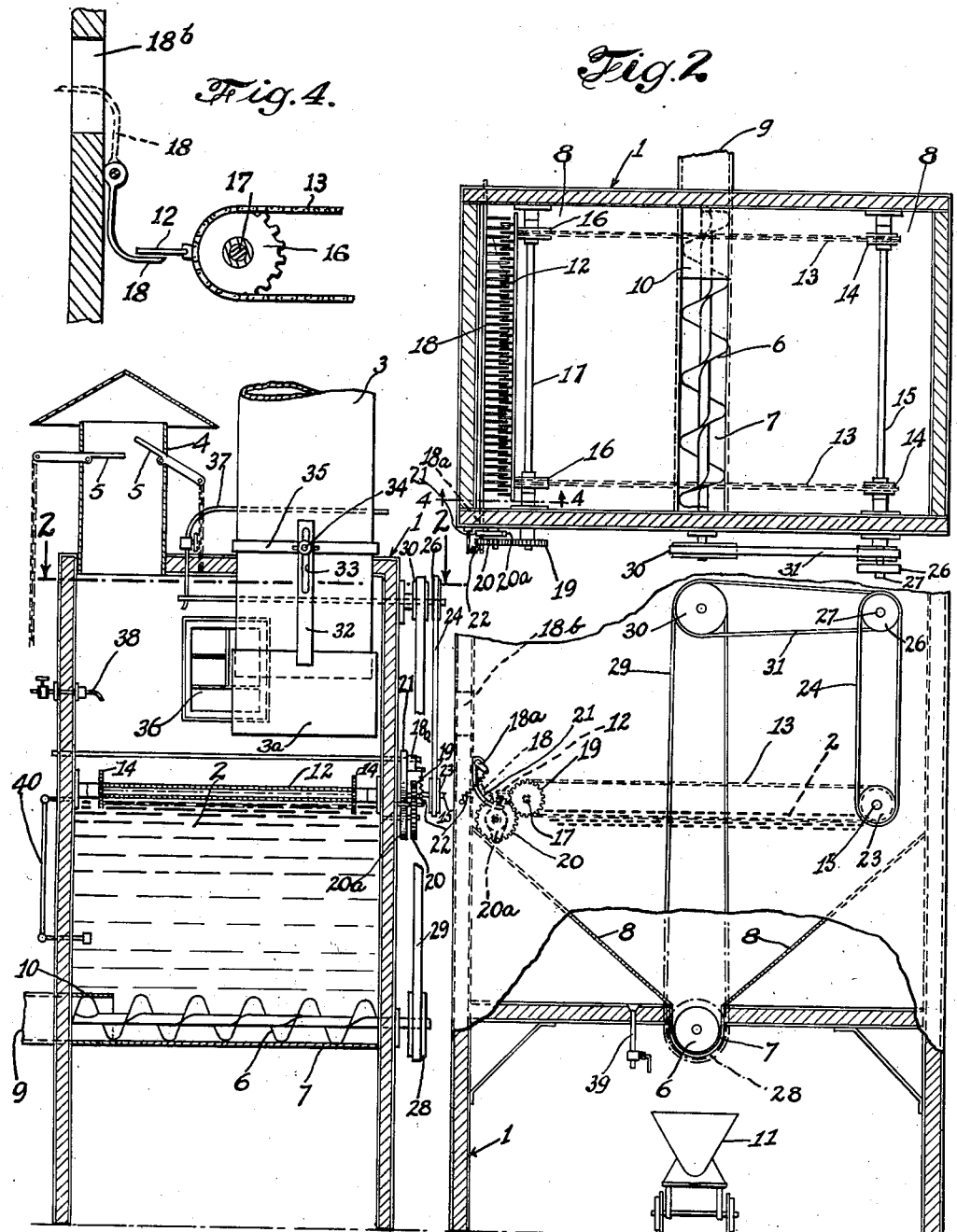
Fig. 1 is a vertical sectional view of a dust removal apparatus embodying the present invention.
Fig. 2 is a horizontal sectional view on the line 2—2 of Fig. 1, with parts omitted.
Fig. 3 is a side view in elevation at right angles to Fig. 1, with part of the casing wall broken away for illustrative purposes.
Fig. 4 is a sectional view on line 4—4 of Fig. 2.

Referring now to the drawing in detail, the apparatus comprises a casing or housing 1 containing a body of water or other suitable liquid, the upper surface of which, indicated by the dot and dash line 2, is a short distance below the inlet conduit 3 for the dust-laden air or gas. In accordance with the method of the present invention, a stream of dust-laden gas is delivered from the mill or factory by exhausters and passed under pressure through inlet conduit 3 from which it issues under pressure and is impelled against the surface of the water and at least the heavier dust particles forced into the water by pressure and momentum. The lighter dust particles which might stay on the surface of the water are skimmed off, continuously or continually in the operation of the apparatus, by the means to be later detailed, whereby to prevent interference with the passage of the dust into the body of water. The air freed from dust passes out through the outlet pipe 4 which, as here shown, is provided with a movable closure or valves 5. Said outlet pipe is sufficiently large to prevent the accumulation of pressure in the housing.

The dust which is driven into the water in housing 1 is, as above stated, removed therefrom. For this purpose there is provided at the bottom of the water chamber positively operable removing means comprising a screw conveyor 6 which operates in a trough 7 freely open at the top. Inclined walls 8 in the water chamber extend downwardly in converging relation to the opposite sides, respectively, of trough 7 to which they are connected. The moistened dust slides down on these inclined walls 8 and is thereby guided into trough 7. From trough 7 said dust is removed in wet condition by a screw conveyor 6 through outlet opening 9 provided at one end of the trough. At said outlet end of the trough, a cylindrical sleeve 10 is provided to seal said trough against the passage of water, except the water in the dust which collects in said trough. Said sleeve is engaged closely on its inner surface by the adjacent end portion of conveyor 6. The dust ejected through outlet opening can be collected in a wheeled receptacle for transfer to the point of disposal.

The surface-dust skimming and removal means comprises a skimming comb 12 which is moved across the surface of the water to remove the dust therefrom. Said comb 12 is carried by a pair of sprocket chains 13 driven by sprocket wheels 14 on a driven shaft 15 and passing over sprocket wheels 16 on a shaft 17. The dust collected by comb 12 is removed by a removal comb 18 pivoted at 18a and arranged to turn from a point below comb 12 to a point thereabove i. e. from the position shown in full lines to the position shown in dotted lines in Fig. 4, the teeth of comb 18 passing between the teeth of comb 12, when the last mentioned comb is, as shown in Fig. 2, adjacent comb 8. A mechanism is provided for thus raising comb 18. Said mechanism comprises a gear 19 on shaft 17 in mesh with a gear 20 which has fixed thereto a cam 20a. A lever 21 fixed to the end of comb 18 is raised by the high point of cam 20a and turns said comb on its pivot to raise the same. A spring 22 resiliently opposes the action of cam 20a on lever 21 and returns the comb 18 to its low or retracted position. The skimmed off dust is ejected by comb 18, through an opening 18b in the adjacent side wall of housing 1, into an adjacent room having a collection receptacle (not shown).

Shaft 15 is driven by a pulley 23 operated by a belt 24 driven by a pulley 26 on a power shaft 27. Screw conveyor is driven by a pulley 28 operated by a belt 29 driven by a pulley 30 actuated by a belt 31 driven by the power shaft.

Inlet conduit 3 is provided with an adjustable end section 3a to regulate the distance of the outlet end of the conduit from the upper surface of the water. Said section 3a is supported for vertical adjustment on conduit 3 by a pair of straps 32 fixed at their lower ends to section 3a and engaged in their slotted portions 33 by screws 34 engaging a fixed strap 35 secured to conduit 3. Access to the housing 1 can be obtained through a door or window 36.

Steam can be admitted into housing 1 through a pipe 37 to prevent the water in said housing from freezing in cold weather and also to catch above the water surface fine dust particles which are not absorbed by the water. Water may be admitted into housing 1 through a pipe 38 and exhausted through a valve controlled pipe 39. A water gage 40 is provided to indicate the level of water in the housing.

While I have shown and described the preferred form of apparatus, it will be understood that certain changes in the details of construction and in the arrangement of parts of the apparatus may be made. Therefore, I do not wish to be limited precisely to the construction herein specifically illustrated or described, except to the extent which may be required by the scope of the appended claims.

Having thus described my invention, what I claim and desire to secure by Letters Patent is:

1. Apparatus for removing dust from air or other gas laden therewith comprising a housing adapted to contain a body of water, means for directing a stream of such air against the upper surface of the body of water in said housing, and means for removing from said body of water below the surface thereof the dust passing therein from said stream of air, means for positively removing dust from the surface of said body of water, said surface dust removal means comprising a skimming device movable at the surface of said body of water thereacross, and means for removing the dust from said skimming device.

2. Apparatus for removing dust from air or other gas laden therewith comprising a housing adapted to contain a body of water, means for directing a stream of such air against the upper surface of the body of water in said housing, means for positively removing dust from the surface of said body of water comprising a skimming device movable at the surface of said body of water thereacross, and means for removing the dust from said skimming device.

3. Apparatus for removing dust from air or other gas laden therewith comprising a housing adapted to contain a body of water, means for directing a stream of such air against the upper surface of the body of water in said housing, and means for removing from said body of water below the surface thereof the dust passing therein from said stream of air, means for positively removing dust from the surface of said body of water comprising a skimming device movable at the surface of said body of water thereacross, and a pivoted member in juxtaposition to said skimming device and operable in predetermined relation to the latter for removing therefrom the dust collected on said skimming device.

4. Apparatus for removing dust from air or other gas laden therewith comprising a housing adapted to contain a body of water, means for directing a stream of such air against the upper surface of the body of water in said housing, means for positively removing dust from the surface of said body of water comprising a comb movable over the surface of the water for collecting dust therefrom, and a comb pivotally mounted in juxtaposition to said first mentioned comb and arranged to have its teeth movable between the teeth of said first mentioned comb for removing the dust therefrom.

5. Apparatus for removing dust from air or other gas laden therewith comprising a housing adapted to contain a body of water on which dust can collect, means for positively removing dust from the surface of said body of water comprising a skimming device movable at the surface of said body of water thereacross, and means for removing the dust from said skimming device.

6. Apparatus for removing dust from air or other gas laden therewith comprising a housing adapted to contain a body of water on which dust can collect, and means for positively removing dust from the surface of said body of water comprising a skimming device movable at the surface of said body of water thereacross, and a pivoted member in juxtaposition to said skimming device and operable in predetermined relation to the latter for removing therefrom the dust collected on said skimming device.

7. Apparatus for removing dust from air or other gas laden therewith comprising a housing adapted to contain a body of water, means for directing a stream of such air against the upper surface of the body of water in said housing, and means for positively removing from said body of water below the surface thereof the dust passing therein from said stream of air, means for removing dust from the surface of said body of water comprising a comb movable over the surface of the water for collecting dust therefrom, and a comb pivotally mounted in juxtaposition to said first mentioned comb and arranged to have its teeth movable between the teeth of said first mentioned comb for removing the dust therefrom.

LEIBA BERNSTEIN.

CERTIFICATE OF CORRECTION.

Patent No. 2,215,574.  September 24, 1940.

LEIBA BERNSTEIN.

It is hereby certified that error appears in the above numbered patent requiring correction as follows: In the grant, line 13, for "her heirs" read --his heirs--; and that the said Letters Patent should be read with this correction therein that the same may conform to the record of the case in the Patent Office.

Signed and sealed this 19th day of November, A. D. 1940.

(Seal)

Henry Van Arsdale,
Acting Commissioner of Patents.